(12) United States Patent    (10) Patent No.: US 7,475,597 B2
Brida et al.                 (45) Date of Patent: Jan. 13, 2009

(54) STRESS ISOLATED PRESSURE SENSING DIE (75) Inventors: Sebastiano Brida, Bourges (FR); Amnon Brosh, Santa Monica, CA (US)

(73) Assignee: Auxitrol S.A., Bourges (FR)

( * ) Notice: Subject to any disclaimer, the term of this patent is extended or adjusted under 35 U.S.C. 154(b) by 0 days.

(21) Appl. No.: 11/712,314

(22) Filed: Feb. 27, 2007

(65) Prior Publication Data

US 2008/0006092 A1    Jan. 10, 2008

Related U.S. Application Data (60) Provisional application No. 60/776,833, filed on Feb. 27, 2006.

(51) Int. Cl.
    *G01L 7/08* (2006.01)
(52) U.S. Cl. .......................................... 73/715
(58) Field of Classification Search .................. 73/720, 73/721, 726, 727
    See application file for complete search history.

(56) References Cited

U.S. PATENT DOCUMENTS

| | | | |
|---|---|---|---|
| 4,237,775 A * | 12/1980 | Eisele | 92/99 |
| 4,800,758 A | 1/1989 | Knecht et al. | |
| 4,930,929 A | 6/1990 | Maglic | |
| 5,926,692 A | 7/1999 | Kurtz | |
| 5,945,605 A | 8/1999 | Julian et al. | |
| 6,093,579 A * | 7/2000 | Sathe | 438/53 |
| 6,528,340 B2 * | 3/2003 | Haji-Sheikh et al. | 438/53 |
| 6,822,318 B2 * | 11/2004 | Honer et al. | 257/669 |

FOREIGN PATENT DOCUMENTS

| | | |
|---|---|---|
| DE | 19714703 A1 | 10/1997 |
| DE | 10349540 A1 | 5/2005 |
| WO | WO-01/69194 A | 9/2001 |

* cited by examiner

*Primary Examiner*—Andre J Allen
(74) *Attorney, Agent, or Firm*—Blakely, Sokoloff, Taylor & Zafman LLP (57) ABSTRACT

The invention relates to a pressure sensing die to be mounted on a base, comprising:
   a sensing structure comprising:
      a diaphragm structure with a deflectable sensing diaphragm whose deflection is representative of the pressure and sensing elements for detecting the deflection of the sensing diaphragm,
      a pedestal supporting the diaphragm structure,
   a linking structure for isolating at least some of the stresses caused by the mounting of the sensing die on the base from said deflectable sensing diaphragm, the linking structure being linked on one side to a bottom surface of the pedestal and to be linked, on an opposite side, to a top surface of the base,
   wherein the linking structure comprises at least one linking element extending between the base and the pedestal and having a mean cross-section smaller than the said bottom surface and top surface so as to constitute a small link between the base and the pedestal.

The invention further relates to a method of manufacturing such a sensing die.

35 Claims, 6 Drawing Sheets

FIG.8B

STRESS ISOLATED PRESSURE SENSING DIE

The present patent application is a non-provisional application claiming the priority of a provisional Application No. 60/776,833 filed Feb. 27, 2006.

FIELD OF THE INVENTION

The present invention relates to pressure sensor assemblies, comprising:
- a sensing die including a deflectable sensing diaphragm whose deflection is representative of the pressure and sensing elements for detecting the deflection of the diaphragm;
- a base supporting the sensing die.

Particularly, the invention relates to such dual stack sensor MEMS assemblies, wherein the sensing die further comprises a Pyrex® pedestal supporting the sensing diaphragm, mounted on bases such as metal headers or substrates made of ceramic or plastic.

BACKGROUND OF THE INVENTION

Figure 1:
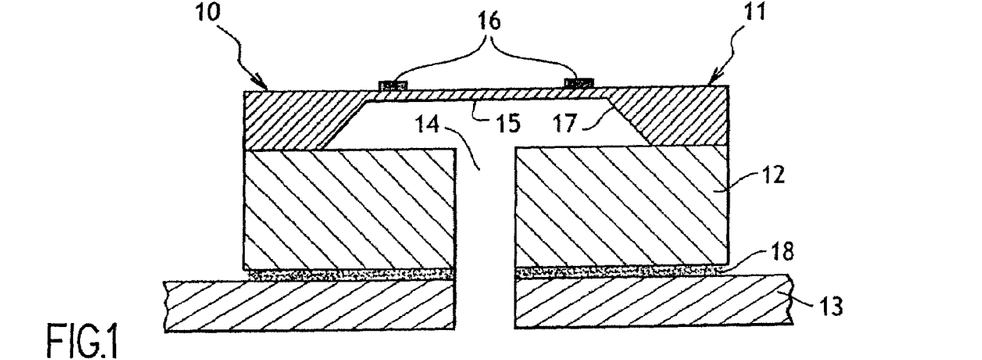
FIG. 1 is a cross-sectional view of a prior art conventional dual stack piezoresistive pressure sensing die mounted on a header or substrate.

Referring to FIG. 1, most known pressure sensing MEMS sensing dies are composed of dual stack dies manufactured by anodic bonding two wafers:
- a silicon wafer 11: a silicon wafer bulk-machined to have at least one thin diaphragm 15 supported by a rigid outer frame 17. Strain gauges, or piezoresistors, 16 are placed on or in the diaphragm 15 in order to sense the stresses produced in the diaphragm 15 by applied pressure;
- a Pyrex® wafer 12: a relatively thick Pyrex® wafer acts as a pedestal to provide support to the silicon wafer 11.

In order to produce a pressure sensor assembly, the Pyrex® pedestal 12 of the dual stack die is normally mounted with an adhesive 18 on a base 13, the base being typically a metal header, or a ceramic or plastic substrate.

Since the thermal coefficient of expansion of Pyrex® is significantly lower than metal or ceramic, the thermal mismatch induces significant compression stresses in the Pyrex® pedestal 12 when the sensor returns to ambient temperature. The locked-in compression stresses, referred to as die-attach stresses, deform the Pyrex® and the outer frame 17 which, in turn, forces the sensing diaphragm 15 to deflect. The deflection is sensed by the diaphragm piezoresistors 15, which generate a die-attach residual null offset output proportional to the locked-in die-attach stresses.

Now, since in most applications the pressure sensors are required to work in a wide range of temperatures, the adhesive 18 used to attach the Pyrex® pedestal 12 onto the base 13 is made of an elastic material, such as RTV.

However, since the RTV is not perfectly elastic and suffers from temperature hysteresis, the locked-in residual null offset does to return to its original value after a temperature cycle.

This appears as short term instability and drift.

In addition, ongoing bond relaxation and RTV aging produce long term effects on the die-attach stresses, which result in long term drifts off sensor offset or null output voltage.

It is to be noticed that these drifts problems are exacerbated in low pressure range sensors that normally use relatively thin diaphragms.

Earlier attempts to isolate the die-attach drift problem involved etching slots or channels in the silicon die in the sensing diaphragm (US 2001/0001550 A1) or adding a plurality of relief channels etched in an upper and a lower surface of an intermediate layer (U.S. Pat. No. 6,822,318 B2).

Since the geometry of channels is dictated by the limited thickness of silicon wafer used in MEMS sensors, this approach requires multiple upper and a lower surface channels is slots with very thin webs, which is problematical and costly to implement.

Furthermore, etching slots or channels in the silicon die around the sensing diaphragm in close proximity to the piezoresistors may create stability problems.

SUMMARY OF THE INVENTION

A purpose of the invention is to overcome the previous drawbacks by proposing a new pressure sensing die that incorporates a stress isolator.

According to a first aspect, the invention proposes a pressure sensing die to be mounted on a base, comprising:
- a sensing structure comprising:
  - a diaphragm structure with a deflectable sensing diaphragm whose deflection is representative of the pressure and sensing elements for detecting the deflection of the sensing diaphragm,
  - a pedestal supporting the diaphragm structure,
- a linking structure for isolating at least some of the stresses caused by the mounting of the sensing die on the base from said deflectable sensing diaphragm, the linking structure being linked on one side to a bottom surface of the pedestal and to be linked, on an opposite side, to a top surface of the base, wherein the linking structure comprises at least one linking element extending between the base and the pedestal and having a mean cross-section smaller than the said bottom surface and top surface so as to constitute a small link between the base and the pedestal. Optionally, the linking structure further comprises a linking base supporting the at least one linking element.

The said stress may be mechanically induced or a result of thermal mismatch between the sensing structure and the base. Indeed thermal mismatch may appear at determinate temperatures if the sensing structure has a global thermal coefficient different from those of the base. For example, such a thermal stress may appear if the pedestal comprises glass, silicon, borosilicate or Pyrex®, and if the base comprises a metal header or a ceramic or plastic substrate.

The said small link allows diminishing the transfer of stresses between the base and the sensing structure, comparing with a larger link, since only a fraction of the stresses are transferred through it.

Additionally, the small link is surrounded by a gap between the pedestal and the linking base in which the base and the linking base are freer to bend, comparing with a larger link.

The said sensing structure is thus prevented from deforming the sensing diaphragm and locked-in residual null offset in the sensing elements.

The short and long term drift problems produced by the stresses are therefore diminished, especially in low pressure range sensors employing thin sensing diaphragms whose sensitivity is high.

Preferably, the invention proposes to further isolate the said stress by arranging the said linking base of the linking structure so as to provide additional stress isolation by one or both of the following means:
- stress absorption;
- stress inhibiting.

In order to provide such a stress absorption, the linking base may comprise a linking diaphragm which supports the linking element, said linking diaphragm being deflectable so as to absorb, in combination with the linking element, some of the stresses caused by the mounting of the sensing die on the base from said deflectable sensing diaphragm.

Stresses, e.g. due to a thermal mismatch in the coefficient of expansion between a metal header and a Pyrex® pedestal which cause significant compression stresses in the sensing structure, force the linking diaphragm to deflect and absorb some of the stresses.

This linking diaphragm acts thus as flexible means, allowing the absorption of most of the stress. The narrow linking element restricts the ability of the remaining stresses from transferring to the pedestal and inducing a residual output in the strain sensing elements on the sensing diaphragm.

According to another embodiment of the invention, the linking base may comprise at least one rigid beam which supports the linking element, said rigid beam being sufficiently rigid so as to uncouple, in combination with the linking element, some of the stresses caused by the mounting of the sensing die on the base from said deflectable sensing diaphragm.

Such a rigid beam acts as rigid clamped cantilever means.

Thus the stresses, e.g. due to a thermal mismatch in the coefficient of expansion between a metal header and the sensing structure which can cause significant compression stresses in the sensing diaphragm, are uncoupled by the rigid beam.

The clamped beam, combined with the narrow linking element, inhibits most of the stress from reaching the sensing diaphragm. The narrow linking element restricts the ability of the remaining stresses from transferring to the pedestal and inducing a residual output in the strain sensing elements on the sensing diaphragm.

Optionally, this particular linking base further comprises a peripheral frame from which each rigid beam extends to a central region of the linking structure, and a deflectable web thinner than the rigid beam and extending inwardly from the peripheral frame. A vent hole may also be provided in the rigid beam, in the linking element and in the pedestal for allowing a gas or fluid that goes through it reaching the bottom side of the sensing diaphragm.

This vent hole may be arranged such that the sensing die measures PSIG and PSID pressure.

This deflectable web may ensure a seal between the vent hole in the base and the vent hole in the pedestal of the sensing structure, while offering a deflection for the linking element.

Alternatively, a gap may be provided in the linking base instead of the deflectable web, the gap extending thus inwardly from the peripheral frame.

This configuration may be used for measuring PSIA. Indeed, these last type of sensing dies have no vent holes in the linking element which can thus hold the sensing structure without need of a further adjacent thin web which would be employed for providing a seal for the through holes for vented PSIG and PSID pressure sensor assemblies.

The linking structure may further comprise stop elements arranged for limiting the magnitude of the potential displacement of the sensing structure.

Some damages in the sensor assembly may then be avoided.

According to another embodiment of the invention, the linking base may alternatively comprise a peripheral frame and a deflectable web extending inwardly from the peripheral frame, wherein the deflectable web supports a first linking element and the peripheral frame supports a second linking element, the first and second linking elements being attached to the sensing structure.

The second linking element is a rigid projection arranged for providing a rigid bond while the first linking element is arranged for providing a compliant link since it is suspended by the deflectable web. The combination isolates the said die-attach stresses by inhibiting it from bending the pedestal.

According to this particular embodiment, a vent hole may be provided in the first linking element and in the pedestal for allowing a gas or fluid that goes through it reaching the bottom side of the sensing diaphragm.

This vent hole allows PSIG and PSID to be measured by the sensing die.

According to a second aspect, the invention proposes a Method of manufacturing a pressure sensing die to be mounted onto a base, comprising the following steps:

(a) providing a first wafer comprising a plurality of sensing structures, each having a diaphragm structure on a pedestal, the diaphragm structure comprising a deflectable sensing diaphragm whose deflection is representative of a pressure and sensing elements for sensing the deflection of the sensing diaphragm;

(b) providing a second wafer;

(c) forming in the second wafer a plurality of linking structures corresponding respectively to the plurality of sensing structures, comprising a selective thinning down of a superficial layer of the second wafer so as to only leave in each linking structure at least one linking element supported by a linking base, wherein each linking element has a mean cross-section smaller than the surfaces of the corresponding pedestal and base with which the corresponding linking structure will be attached;

(d) attaching the second wafer with the first wafer; and (e) cutting the attached first and second wafers so as to individualize at least one sensing die comprising one of the plurality of the sensing structures attached to a corresponding one of the plurality of linking structures; wherein this linking structure isolates at least some of the stresses caused by a mounting of the sensing die on a base from said sensing diaphragm due to the small link constituted by the linking element.

The processing steps of this method are wafer level, which makes sensor dies mass producible and cost effective.

Step (b) may further comprise, before the thinning-down, a bulk-machined for defining in each linking structure a linking base comprising a frame and a membrane on the frame.

Step (d) may be provided by wafer bonding, e.g. anodic bonding especially if the surface of the pedestal to be bonded is of glass, silicon, borosilicate, or Pyrex®, and the linking structure is of silicon, glass, Pyrex® or borosilicate.

The method may further comprise, after step (e), the attachment of each individualized sensing die to a base, like a metal header or a plastic or ceramic substrate. The attachment may be performed by an adhesive layer.

Since the die-attach stress is managed by the linking structure of the invention, it is thus permitted replacing the elastic RTV adhesive by other adhesives chosen in larger range of adhesives, like rigid adhesives such as epoxy or glass frit, that have negligible temperature hysteresis compared to RTV.

BRIEF DESCRIPTION OF THE DRAWINGS

FIGS. 8A and 8B are simulations of magnified distortions induced in the sensing diaphragm by a residual die-attach compression stresses. FIG. 8A shows the distortion of a conventional dual stack die attached through its glass pedestal to a header or substrate. FIG. 8B show the distortion for a triple stack die attached through its flexible linking, according to the first embodiment of the invention, to a header or substrate.

DETAILED DESCRIPTION OF THE INVENTION

FIGS. 2, 3A, 4A, 4C and 5A illustrate cross-sectional views of different triple stack sensor dies 20 according to invention, comprising a pressure sensing capsule 11-12, employing a linking structure 71 (FIG. 2), 21 (FIG. 3A), 31(FIG. 4A), 61(FIG. 4C), 31A (FIG. 5A), mounted on a base 13.

The sensing capsule 11-12 comprising a diaphragm structure 11 on a pedestal 12.

The diaphragm structure 11 comprises an outer frame 17 and a deflectable sensing diaphragm 15 suspended over the outer frame 17. The sensing diaphragm 15 is arranged for deflecting under a pressure applied thereon, the deflection being representative of the applied pressure.

The deflectable sensing diaphragm 15 is typically manufactured by etching away substance from a portion of an initial wafer, e.g. according to a square or round pattern, or by other well-known techniques.

Sensing elements 16, like Piezoresistors or strain gauges, are then deposited or formed, e.g. by diffusion or implantation, on or in the sensing diaphragm 15 by technique know per se. These sensing elements 16 are arranged for detecting the deflection of the sensing diaphragm 15, e.g. by providing an output signal depending on the deflection and thus on the applied pressure.

The diaphragm structure 11 might be made of silicon or silicon-germanium, or of another semiconductor material or alloy.

The sensing diaphragm 15 may also include a buried dielectric layer (not shown), e.g. made of $SiO_2$, extending all by the area of the sensing diaphragm 15, and dedicated to electrically insulate the sensing elements 16 from the outer frame 17. The sensing elements 16 are then of a SOI-type ("Silicon-On-Insulator"-type).

The sensing capsule 11-12 further comprises a pedestal 12 for supporting and rigidifying the diaphragm structure 11. This pedestal 12 might be made of glass, borosilicate, Pyrex® or silicon.

This pedestal 12 may be attached to the outer frame 17 by bonding, like an anodic bonding, or by other well-known inorganic techniques.

The pedestal 12 may contain one vent hole 14, or a plurality of vent holes 14, for allowing a gas or a fluid going through. The sensing capsule 11-12 is then a differential pressure sensor ("PSID") or a relative pressure sensor ("PSID").

Alternatively, the sensing capsule 11-12 is an absolute pressure sensor, and the pedestal 12 does not contain vent hole 14.

The linking structure 71 (FIG. 2), 21 (FIG. 3A), 31(FIG. 4A), 61(FIG. 4C), 31A (FIG. 5A) is linked on one side to the bottom surface of the pedestal 12 and linked, on an opposite side, to the top surface of the base 13.

The linking structure 71 (FIG. 2), 21 (FIG. 3A), 31(FIG. 4A), 61(FIG. 4C), 31A (FIG. 5A) comprises at least one linking element 73 (FIG.2), 23 (FIG. 3A), 34 (FIG. 4A), 64 (FIG. 4C), 36 (FIG. 5A) extending between the base 13 and the pedestal 12. This linking element has a mean cross-section smaller than the said bottom and top surfaces so as to constitute a small link between the base 13 and the pedestal 12. The cross-section of the linking element may be round, square, tapered-shaped or other shape. The linking element may for example be a rod whose axis extending generally perpendicular to the sensing diaphragm 15.

This small link allows isolating at least some of the stresses caused by the mounting of the sensing die on the base from said deflectable sensing diaphragm.

The linking structure 71 (FIG. 2), 21 (FIG. 3A), 31(FIG. 4A), 61(FIG. 4C) may be made of silicon, glass, Pyrex®, or borosilicate, and can be attached to the pedestal 12 by bonding, like anodic bonding.

The triple die stack sensor die 70 (FIG. 2), 20 (FIG. 3), 30 (FIG. 4A), 60 (FIG. 4C), 30A (FIG. 5A) is preferably made from:
 a first wafer comprising a plurality of the said sensing structures, each including a diaphragm structure 11 bonded to a pedestal 12; and
 a second wafer comprising a plurality of the said linking structures 71 (FIG. 2), 21 (FIG. 3A), 31(FIG. 4A), 61(FIG. 4C), 31A (FIG. 5A) corresponding respectively to the plurality of sensing structures.

The first wafer may be made from a semiconductor wafer (e.g. of silicon, SiGe, or other semiconductor material or alloy) bonded to a pedestal wafer (e.g. of silicon, glass, borosilicate, or Pyrex®), wherein the semiconductor wafer comprises the plurality of diaphragm structures 11 simultaneously formed on the whole wafer.

The said step of forming the linking structures 71 (FIG. 2), 21 (FIG. 3A), 31(FIG. 4A), 61 (FIG. 4C), 31A (FIG. 5A) are implemented on the whole second wafer, such that the plurality of linking structures is simultaneously manufactured. This step includes a selective thinning down, e.g. by etching, implemented from the surface of the second wafer, so as to only leave in each linking structure at least one linking element 73 (FIG. 2), 23 (FIG. 3A), 34 (FIG. 4A), 64 (FIG. 4C), 36 (FIG. 5A).

The first and second wafers are then attached together on their whole surface, such that the plurality of the pressure sensing capsules 11-12 are attached simultaneously with the plurality of the linking structures through the linking elements, for example by bonding such as anodic bonding.

Once the plurality of similar sensing dies 70 (FIG. 2), 20 (FIG. 3), 30 (FIG. 4A), 60 (FIG. 4C), 30A (FIG. 5A) are manufactured in series in a wafer assembly, they are diced or individualized to form isolated pressure sensing dies.

The processing steps of this particular manufacturing method of the invention is thus wafer level, which makes sensing dies mass producible and cost effective.

Then, each sensing die 70 (FIG. 2), 20 (FIG. 3), 30 (FIG. 4A), 60 (FIG. 4C), 30A (FIG. 5A) is attached to a base 13, for example via an adhesive layer 27 made of, for example, elastic RTV, hard epoxy adhesive or glass frit.

The base 13 may be a metal header or a plastic or ceramic substrate that have thermal mismatch with a Pyrex® or silicon wafer 12.

The invention proposes different particular embodiments of linking structures 71 (FIG. 2), 21 (FIG. 3A), 31(FIG. 4A), 61(FIG. 4C), 31A (FIG. 5A).

Figure 2:
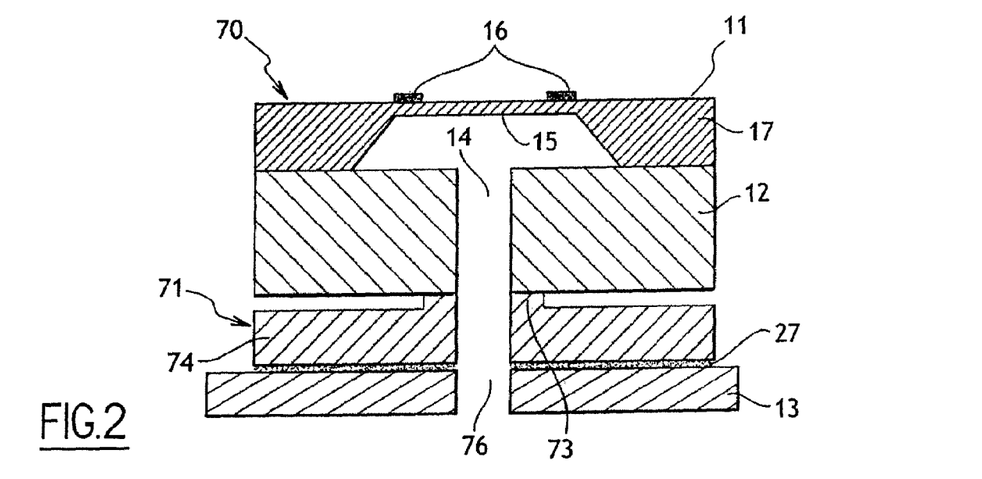
FIG. 2 is a cross-sectional view of a vented version of a triple stack piezoresistive pressure sensing die employing a linking structure comprising a linking base made of a bulk material from which a linking element protrudes, the die being mounted on a header or substrate.

Referring to FIG. 2, a linking structure 71 according to a first embodiment comprises the said linking element 73 extending from a bulk linking base 74 towards the pedestal 12. The linking element 73 is bonded to the pedestal and the bulk linking base 74 is bonded to the base 13.

Figure 3:
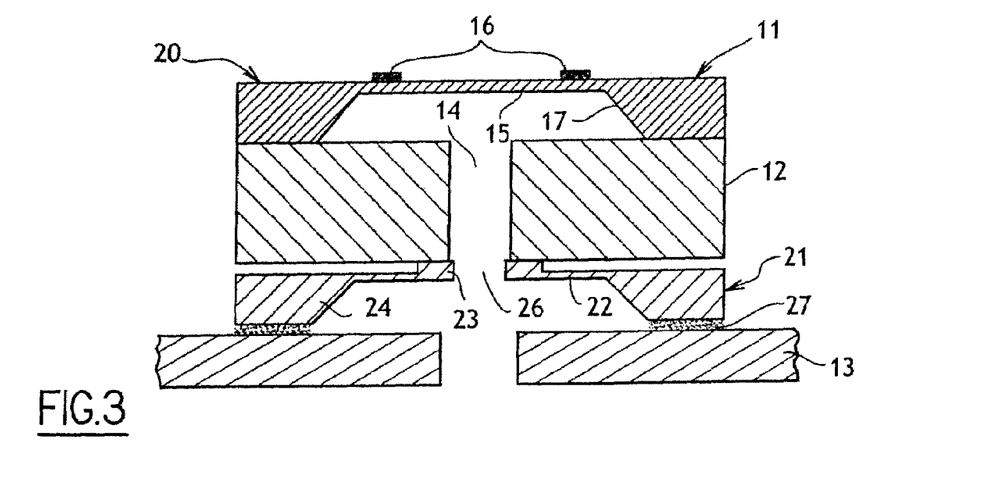
FIG. 3 is a cross-sectional view of a vented version of a triple stack piezoresistive pressure sensing die employing a flexible linking according to a first embodiment of the invention, the die being mounted on a header or substrate.

According to another embodiment, referring to FIG. 3, the linking structure 21 comprises an outer frame 24 and a flexible diaphragm 22 on the frame 24, the flexible diaphragm 22 being deflectable under stress. The linking element 23 extends from the flexible diaphragm 22 towards the pedestal 12. The linking element 23 is bonded to the pedestal 12 and the outer frame 24 is bonded to the base 13.

This linking structure 21 may be manufactured from the said second wafer that is firstly bulk-machined for forming a linking membrane (not shown in FIG. 3) supported by the rigid frame 24.

A selective thinning-down process, like a selective etching, is further implemented in order to selectively thin down the linking membrane for leaving the thin flexible diaphragm 22 and the liking element 23, provided on the top surface of the linking diaphragm 22.

The linking element 23 and the diaphragm 22 may contain a vent hole 26 extending from the vent hole 14 of the pedestal 12, for measuring PSIG and PSID pressures.

Alternatively, the linking element 23 and the diaphragm 22 do not contain vent hole 14 in order the sensor assembly 10 measuring absolute PSIA pressures.

Thin linking diaphragm 22 is designed to be a flexible linking used for stress absorption.

Figure 4A:
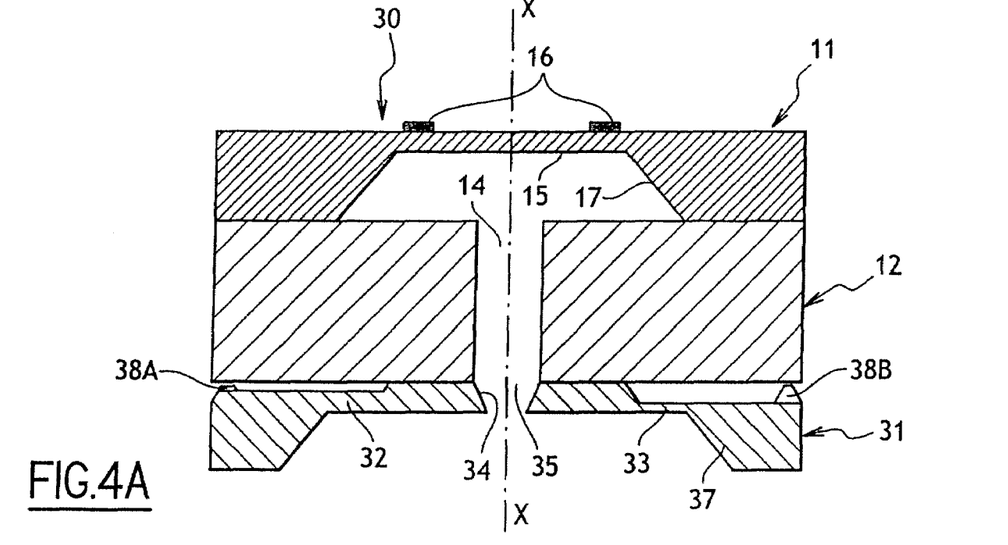
FIG. 4A is a cross-sectional view, according to A-A plane of FIG. 4B, of a vented version of a triple stack piezoresistive pressure sensing die employing a stress inhibiting linking according to a second embodiment of the invention.
Figure 4B:
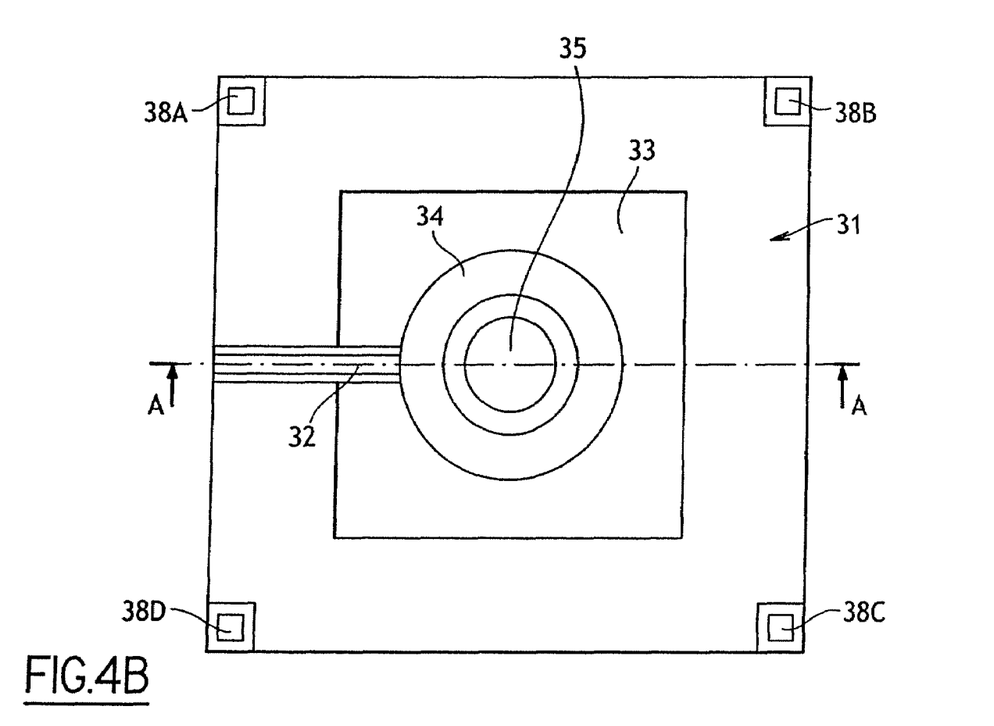
FIG. 4B is a top view of the pressure sensing die of FIG. 4A.
Figure 5A:
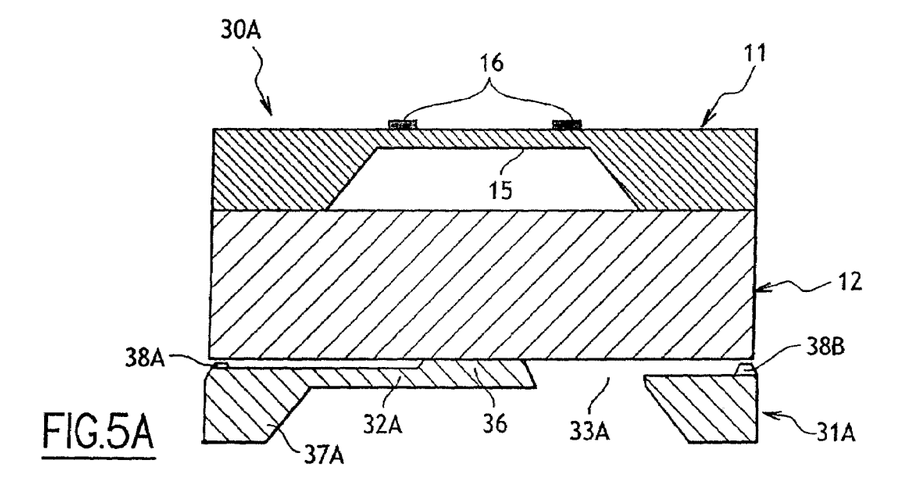
FIG. 5A is a cross-sectional view, according to A-A plane of FIG. 5B, of an absolute version of a triple stack piezoresistive pressure sensing die employing a stress inhibiting linking according to the second embodiment of the invention.

According to another embodiment, referring to FIGS. 4A and 4B, the linking structure 31 comprises an outer frame 37 and a rigid beam 32 extending from the outer frame 37 towards a central region of the linking structure 31. The rigid beam 32 stays rigid under stress. The linking element 34 extends from the rigid beam 32 towards the pedestal 12. The linking element 34 is bonded to the pedestal 12 and the outer frame 37 is bonded to the base 13 (not shown).

The linking element 34 may be a rod or tapered-shaped with the main axis substantially perpendicular to the rigid beam 32 and a diameter greater than the width of the rigid beam 32, the linking element 34 being placed at the central region of the linking structure 31 (see FIG. 4B).

Additionally, the linking structure 31 further comprises a deflectable web 33 thinner than the rigid beam 32 and extending inwardly from the outer frame 37.

The linking structure 31 may be manufactured from the second wafer that is firstly bulk-machined for forming a thick membrane (not shown in FIG. 4A or 4B) supported by a rigid frame 37.

Then the thick membrane is selectively thinned down, e.g. by selective etching, to form on the frame 37 an area corresponding to the thin web 33 and a thicker area corresponding to the rigid beam 32 supporting the linking element 34.

The length of the rigid beam 32 is preferably chosen so as to allow the linking element 34 solidly holding the sensing structure 11-12. It may be chosen so as to locate the central part of the linking element 34 at or close to a transversal axis X-X of symmetry of the sensing diaphragm 15.

Linking structure 34 may contain a vent hole 35 extending from the vent hole 14 of the pedestal 12, for measuring PSIG and PSID pressures.

Alternatively, the linking structure 34 does not contain vent hole 35. The sensing die 30 is thus an absolute PSIA pressure sensing die.

Furthermore, the processing of the linking membrane may further define bumps 38A-38B-38C-38D located on the frame 37 for restricting the displacement of the sensing structure 11-12 of the sensing die 30. The magnitude of the potential bending of the sensing structure 11-12 is thus limited by these stop elements 38A-38B-38C-38D, preventing structural damages and/or large residual null offset due to a too important bending.

The rigid beam 32 inhibits the die-attach stresses developed in frame 37 from bending pedestal 12 and prevents deforming the frame 37 of sensing diaphragm 15 and inducing strain in the sensing elements 16.

Figure 4C:
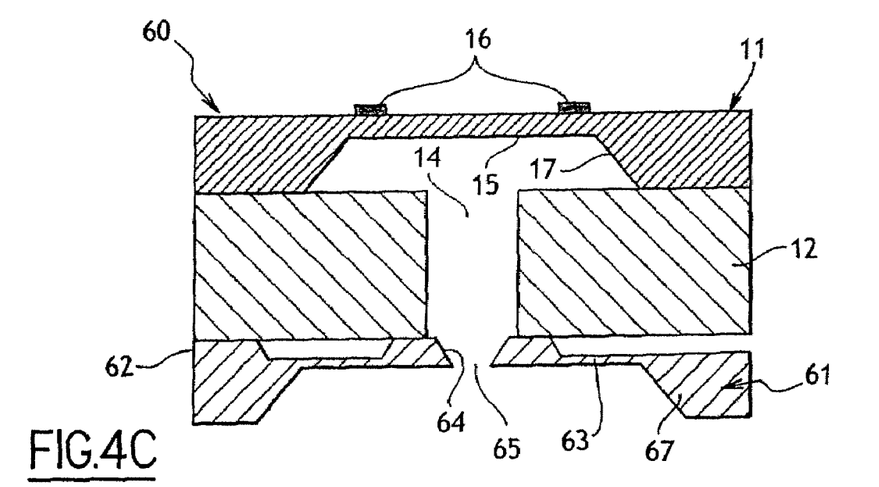
FIG. 4C is a cross-sectional view, according to A-A plane of FIG. 4D, of an alternative vented version of a triple stack piezoresistive pressure sensing die employing a stress inhibiting linking according to the second embodiment of the invention.
Figure 4D:
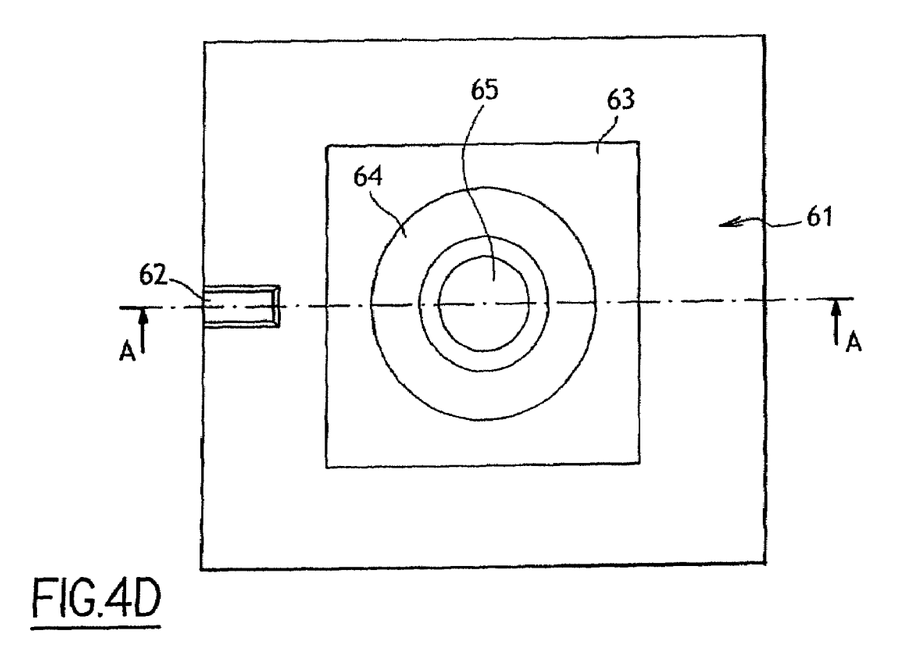
FIG. 4D is a top view of the pressure sensing die of FIG. 4C.

FIGS. 4C and 4D illustrate an alternative vented version of a sensing die 60 according to the last embodiment of the invention.

The linking structure 61 comprises an outer frame 67 and a web 63 extending inwardly from the outer frame 67 towards a central region of the linking structure 61. The web 63 is deflectable under die-attach stress. A first linking element 64 extends from the web 63 towards the pedestal 12 at the central region. A second linking element 62 extends from the outer frame 67 towards the pedestal 12. The second linking element 62 stays rigid under die-attach stress. Both the first and second linking elements 64,62 are bonded to the pedestal 12, and the outer frame 67 is bonded to the base 13 (not shown).

The first linking element 64 may be a rod or taperedshaped with a main axis substantially perpendicular to the web 63.

The second linking element 64 may be parallelepidepic.

After the linking structure 61 was bulk-machined to form a thick membrane (not shown) supported by the rigid frame 67, the top of the membrane is shaped by selective thinning down, like selective etching, to form the first linking element 64 and second linking element 62 and the thin web 33.

The second linking element 62 provides a rigid bond. The first linking element 64 provides a compliant link since it is suspended by thin web 63. This combination inhibits the die-attach stresses developed in frame 67 from bending pedestal 12. It prevents deforming frame 17 of sensing diaphragm 15 and inducing strain in the gauges 16 of the sensing diaphragm.

Figure 5B:
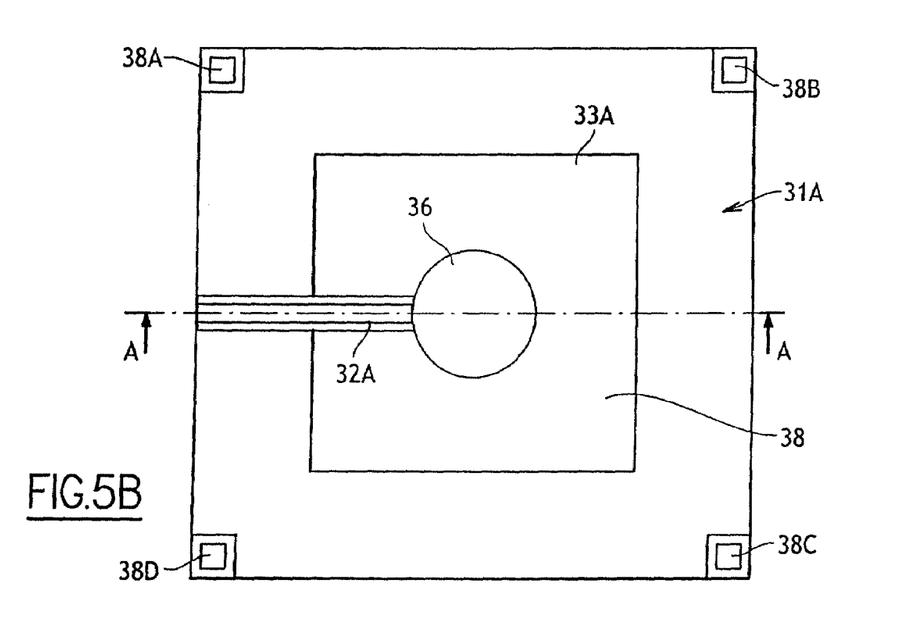
FIG. 5B is a top view of the pressure sensing die of FIG. 5A.

Another embodiment according to the invention is shown on FIGS. 5A and 5B. It relates to a sensing die 30A for measuring an absolute PSIA pressure, while the sensing pressure die 30 shown on FIGS. 4A and 4B is designed for measuring gauge PSIG and differential PSID pressures.

The linking structure 31A comprises an outer frame 37A and a rigid beam 32A extending from the outer frame 37A towards a central region of the linking structure 31A. The rigid beam 32A stays rigid under stress. The linking element 36 extends from the rigid beam 32 towards the pedestal 12. The linking element 36 is bonded to the pedestal 12 and the outer frame 37A is bonded to the base 13 (not shown).

The linking element 36 may be a rod or tapered-shaped or other shape with a main axis substantially perpendicular to the rigid beam 32A and a diameter greater than the width of the rigid beam 32A, the linking element 36 being placed at the central region of the linking structure 31A (see FIG. 4B).

The linking structure 31A may be manufactured from the said second wafer that is firstly bulk-machined for forming a thick linking membrane (not shown in FIG. 5A or 5B) laterally suspended by the outer frame 37A.

Then the thick membrane is selectively thinned down, e.g. by selective etching, to form the rigid beam 32 and linking element 36. The rest of the membrane is entirely removed for forming a gap 33A.

The length of the rigid beam 32A is preferably chosen so as to allow the linking element 36 solidly holding the sensing structure 11-12. It may be chosen so as to locate the central part of the linking element 36 at or close to a transversal axis X-X of symmetry of the sensing diaphragm 15.

The linking element 36 can hold the sensing structure 11-12 without need of a further adjacent thin web 33 (like for the sensing die 30 of FIG. 4A-4B) which would be employed for providing a seal for the through holes for vented PSIG and PSID pressure sensor assemblies.

Furthermore, the thinning-down of the wafer linking 31A may further define stop elements or bumps 38A-38B-38C-38D located on the frame 37A for forming abutments to a potential bending of the sensing structure 11-12 of the die 30A. The magnitude of the potential bending of this sensing structure 11-12 is thus limited by these stop elements 38A-38B-38C-38D, preventing structural damages and/or large residual null offset due to a too important bending.

The rigid beam 32A inhibits the die-attach stresses developed in frame 37A from bending pedestal 12 and prevents deforming the frame 37A of sensing diaphragm 15 and inducing strain in the sensing elements 16 of the sensing diaphragm 15.

Figure 6:
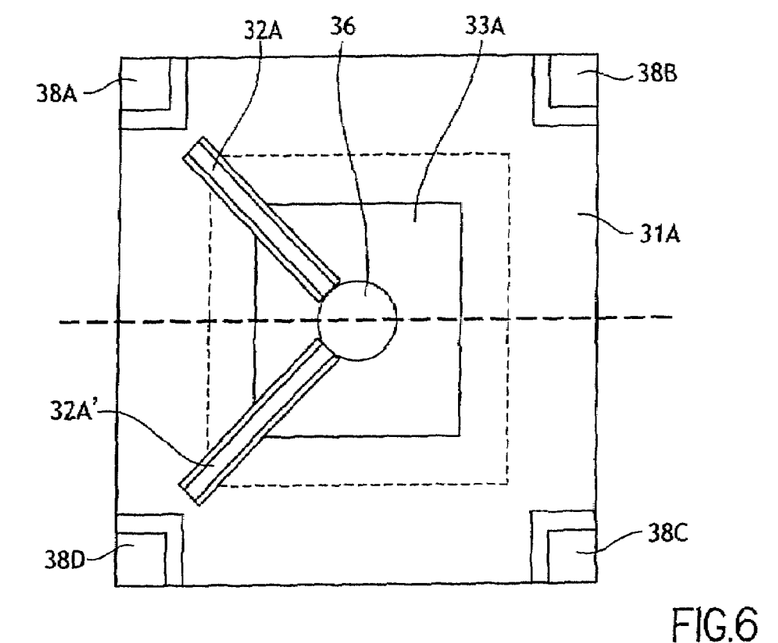
FIG. 6 is a top view of an absolute version of a triple stack piezoresistive pressure sensing die employing a stress inhibiting linking with two rigid beams according to the second embodiment of the invention.
Figure 7:
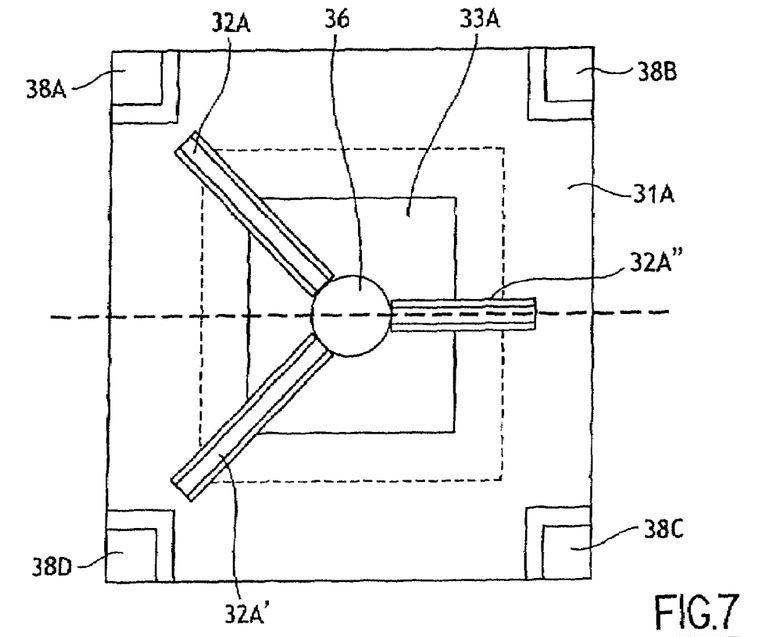
FIG. 7 is a top view of an absolute version of a triple stack piezoresistive pressure sensing die employing a stress inhibiting linking with three rigid beams according to the second embodiment of the invention.

FIGS. 6 and 7 show alternative sensor dies according to FIGS. 4A and 5A, which are provided with more than one rigid beam 32A, such as two (FIG. 6). Three (FIG. 7), or more, rigid beams 32A may be used in some cases.

It is also to be noticed that, in the single or multiple beam configurations, the width and length of each beam 32A may be correspondingly increased or decreased in order to optimize their performance as stress linkings. It may then be possible, for example, in a multiple beams 32A configuration, choosing a width which is half the width of a single beam of FIG. 5B in a two-beams 32A configuration.

Figure 8A:
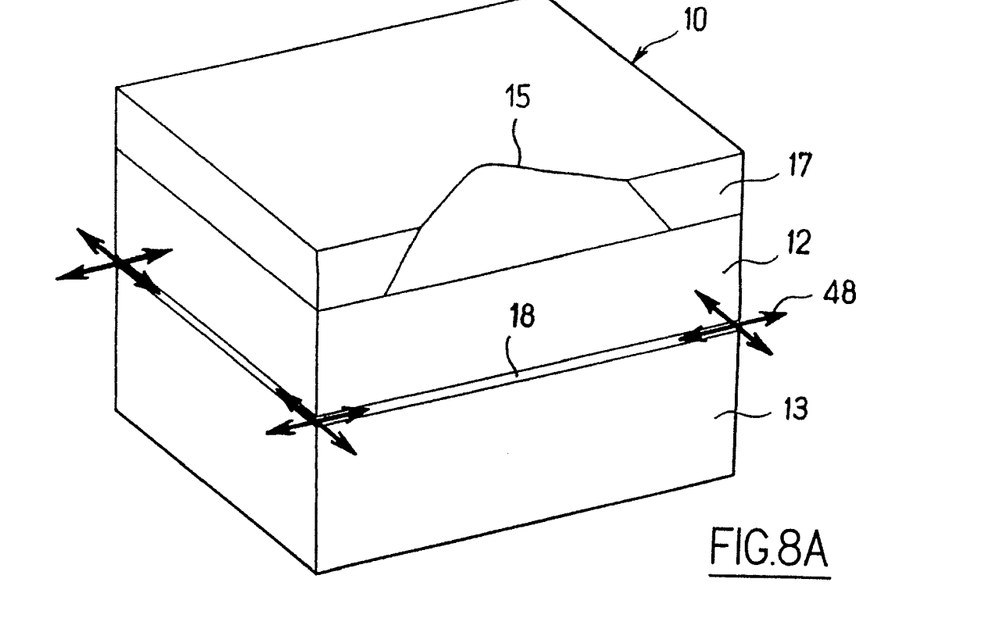
Figure 8B:
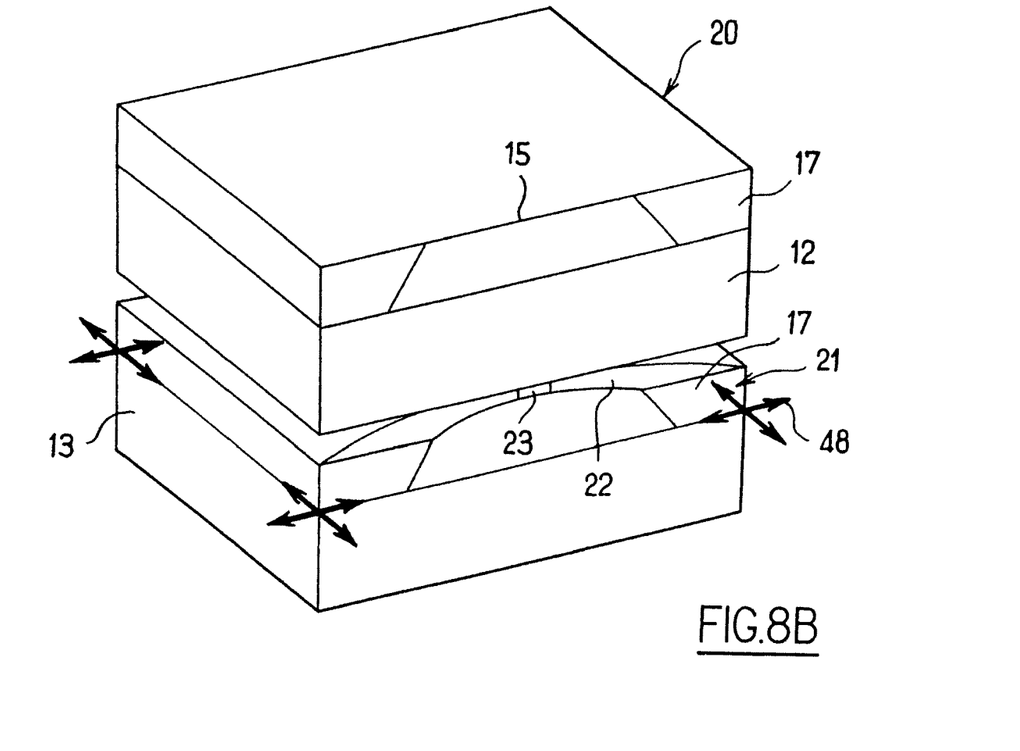

FIGS. 8A and 8B are simulations of magnified distortions induced in the sensing diaphragm 15 by the residual die-attach compression stresses for, respectively, the known dual stack die 10 of FIG. 1 and for the triple stack die 20 of FIG. 3.

FIG. 8A shows the known dual stack piezoresistive pressure sensing die 10 of FIG. 1. Pressure sensing die 10 consists of silicon sensing membrane structure 11 anodic bonded to a Pyrex® pedestal 12. The bottom surface of the Pyrex® pedestal 12 is attached to a metal base 13 such as stainless steel. As can be seen, the compression stresses 48, induced by the thermal mismatch between the Pyrex® and the metal, bend the Pyrex® pedestal 12, which forces the frame 17 to deform the sensing diaphragm 15 and to generate a residual offset output in the strain gauges (not shown) located on or in sensing diaphragm 15.

FIG. 8B shows the triple stack piezoresistive pressure sensing die 20 of FIG. 3. This die 20 comprises a flexible silicon linking 21 mounted on a metal header 13. The dimensions of the die 20 and header 13 and material chosen are the same as those of FIG. 8A. The stress absorption linking 21 with flexible membrane 22, outer frame 24 and linking element 23 is anodic bonded to the Pyrex® pedestal 12. The flexible linking 21 is bonded to the metal header 13 via a RTV layer. As can be seen, compression stresses 48 compel linking frame 24 to deform, which flexes thin linking diaphragm 22. The flexing of membrane 22 absorbs the die-attach compression stresses which are prevented from reaching the Pyrex® pedestal 12 via small linking element 23. As a result, outer frame 17 of pressure sensing structure 11 does not deform the sensing diaphragm 15 which significantly reduces the residual offset output produced in the strain gages (not shown) located on or in the sensing diaphragm 15.

The invention claimed is:

1. Pressure sensing die to be mounted on a base, comprising:
   a sensing structure comprising:
   a diaphragm structure with a deflectable sensing diaphragm whose deflection is representative of the pressure and sensing elements for detecting the deflection of the sensing diaphragm,
   a pedestal supporting the diaphragm structure,
   a linking structure for isolating at least some of the stresses caused by the mounting of the sensing die on the base from said deflectable sensing diaphragm, the linking structure being linked on one side to a bottom surface of the pedestal and to be linked, on an opposite side, to a top surface of the base,
   wherein the linking structure comprises at least one linking element extending between the base and the pedestal and having a mean cross-section smaller than said bottom surface and top surface so as to constitute a small link between the base and the pedestal.

2. Pressure sensing die according to claim 1, wherein the linking element is a rod.

3. Pressure sensing die according to claim 1 or 2, wherein the linking element is placed at a central region of the linking structure.

4. Pressure sensing die according to claim 1, wherein the linking structure further comprises a linking base supporting the at least one linking element.

5. Pressure sensing die according to claim 4, wherein the linking base is a bulk structure.

6. Pressure sensing die according to claim 4, wherein the linking base comprises a linking diaphragm which supports the linking element, said linking diaphragm being deflectable so as to absorb some of the stresses caused by the mounting of the sensing die on the base from said deflectable sensing diaphragm.

7. Pressure sensing die according to claim 4, wherein the linking base comprises at least one rigid beam which supports the linking element, said rigid beam being sufficiently rigid so as to uncouple some of the stresses caused by the mounting of the sensing die on the base from said deflectable sensing diaphragm.

8. Pressure sensing die according to claim 7, wherein the linking base further comprises a peripheral frame from which each rigid beam extends to a central region of the linking structure.

9. Pressure sensing die according to claim 8, wherein the linking base further comprises a deflectable web thinner than the rigid beam and extending inwardly from the peripheral frame.

10. Pressure sensing die according to claim 9, wherein a vent hole is provided in the rigid beam, in the linking element and in the pedestal for allowing a gas or fluid that goes through it reaching the bottom side of the sensing diaphragm.

11. Pressure sensing die according to claim 8, wherein a gap is provided in the linking base, the gap extending inwardly from the peripheral frame.

12. Pressure sensing die according to claim 7, wherein the linking structure further comprises stop elements arranged for limiting the magnitude of the potential displacement of the sensing structure.

13. Pressure sensing die according to claim 4, wherein the linking base comprises a peripheral frame and a deflectable web extending inwardly from the peripheral frame, wherein the deflectable web supports a first linking element and the peripheral frame supports a second linking element, the first and second linking elements being attached to the sensing structure.

14. Pressure sensing die according to claim 13, wherein a vent hole is provided in the first linking element and in the pedestal for allowing a gas or fluid that goes through it reaching the bottom side of the sensing diaphragm.

15. Pressure sensing die according to claim 1, wherein the said stresses correspond to a thermal mismatch between the sensing structure and the base.

16. Pressure sensing die according to claim 1, wherein the linking structure is linked by anodic bonding to the sensing structure.

17. Pressure sensing die according to claim 1, wherein the pedestal is made of silicon, borosilicate, glass or Pyrex.RTM., and the diaphragm structure comprises silicon.

18. Pressure sensing die comprising:
a diaphragm structure with a deflectable sensing diaphragm, whose deflection is representative of the applied pressure; and
a pedestal comprising two linked parts connected with at least one narrow linking elements such that the at least one linking element isolates said deflectable sensing diaphragm from at least some of the stresses caused by mounting the pressure sensing die on a base.

19. Sensor assembly comprising a pressure sensing die according to claim 1 or 18, and a base, like a metal header or a plastic or ceramic substrate, on which the pressure sensing die is mounted.

20. Sensor assembly according to claim 19, wherein the pressure sensing die is mounted on the base via an adhesive layer.

21. Sensor assembly according to claim 19, wherein the pressure sensing die is mounted on the base via a rigid adhesive layer.

22. Method of manufacturing a pressure sensing die to be mounted onto a base, comprising the following steps:
(a) providing a first wafer comprising a plurality of pressure sensing structures, each having a diaphragm structure on a pedestal, the diaphragm structure comprising a deflectable sensing diaphragm whose deflection is representative of a pressure and sensing elements for sensing the deflection of the sensing diaphragm;
(b) providing a second wafer;
(c) forming in the second wafer a plurality of linking structures corresponding respectively to the plurality of sensing structures, comprising a selective thinning down of a superficial layer of the second wafer so as to only leave in each linking structure at least one linking element supported by a linking base, wherein each linking element has a mean cross-section smaller than the surfaces of the corresponding pedestal and base with which the corresponding linking structure will be attached;
(d) attaching the second wafer with the first wafer; and
(e) cutting the attached first and second wafers so as to individualize at least one sensing die comprising one of the plurality of the sensing structures attached to a corresponding one of the plurality of linking structures; wherein this linking structure isolates at least some of the stresses caused by a mounting of the sensing die on a base from said sensing diaphragm due to the small link constituted by the linking element.

23. Method according to claim 22, wherein step (b) further comprises, before the thinning-down, a bulk-machined for defining in each linking structure a linking base comprising a frame and a membrane on the frame.

24. Method according to claim 23, wherein each membrane is further selectively thinned-down so as to form a thin diaphragm supporting the linking element, the thin diaphragm being deflectable under the said stresses.

25. Method according to claim 24, wherein each membrane is further selectively thinned-down so as to form at least one rigid arm supporting the linking element, the at least one rigid beam staying mainly rigid under the said stresses.

26. Method assembly according to claim 25, wherein the thinning-down is implemented so as to further form a deflectable web thinner than the rigid beam in the remaining part of each membrane.

27. Method assembly according to claim 25, wherein the thinning-down is implemented so as to remove the remaining part of each membrane after having formed therein the rigid beam and the linking element.

28. Method assembly according to claim 25, wherein the thinning-down is implemented so as to further form stop elements provided on each frame, the stop elements being arranged for limiting the magnitude of a displacement of the sensing structure that may occur during step (e).

29. Method according to claim 23, wherein each frame is peripheral to the corresponding linking structure, wherein the thinning-down is implemented so as to form, in each membrane, a deflectable web extending inwardly from the frame and supporting a first linking element, and a second linking element supported by the frame, and wherein first and second linking elements are attached to the sensing structure during step (d).

30. Method according to claim 22, wherein the thinning-down step comprises etching.

31. Method according to claim 22, wherein the thinning-down step consists in etching.

32. Method according to claim 22, wherein the attachment of step (d) comprises anodic bonding.

33. Method according to claim 22, wherein the step (a) comprises the forming of the first wafer by wafer bonding between a top wafer comprising the plurality of diaphragm structures and a bottom wafer comprising the plurality of pedestals.

34. Method according to claim 22, further comprising, after step (e), the attachment of one individualized sensing die to a base, like a metal header or a plastic or ceramic substrate, such that the linking structure is located between the sensing structure and the base.

35. Method according to claim 22, wherein the attachment of the individualized sensing die with a base comprising firstly a forming of an adhesive layer on one or both of the surface to be attached and secondly a contacting of the base with the sensing die, possibly followed by a thermal treatment.

* * * * *

UNITED STATES PATENT AND TRADEMARK OFFICE
CERTIFICATE OF CORRECTION

PATENT NO. : 7,475,597 B2
APPLICATION NO. : 11/712314
DATED : January 13, 2009
INVENTOR(S) : Sebastiano Brida and Amnon Brosh

Page 1 of 1

It is certified that error appears in the above-identified patent and that said Letters Patent is hereby corrected as shown below:

On the Title Page, Item (75) should read
Inventors: Amnon Brosh, Santa Monica, CA (US)
　　　　　　Sebastiano Brida, Bourges (FR)

Signed and Sealed this

Thirty-first Day of March, 2009

JOHN DOLL
*Acting Director of the United States Patent and Trademark Office*